May 30, 1944.  O. C. MARTIN  2,350,057
FORMING TOOL
Filed May 26, 1941
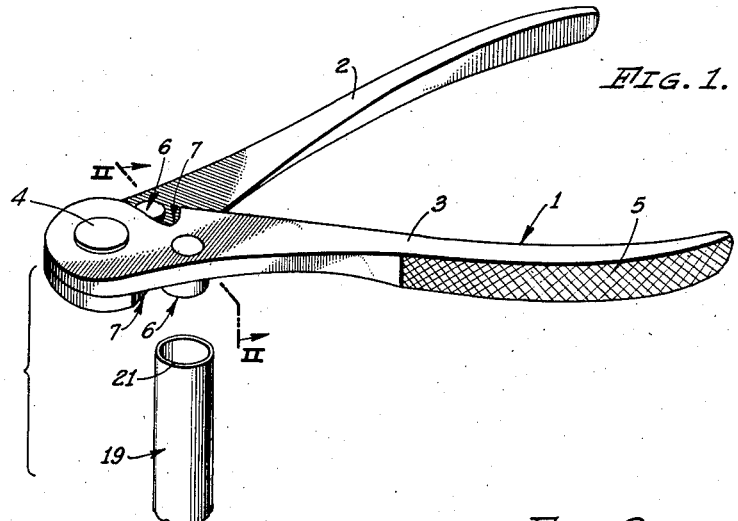
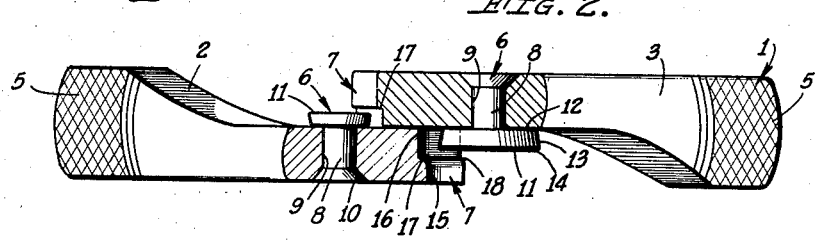
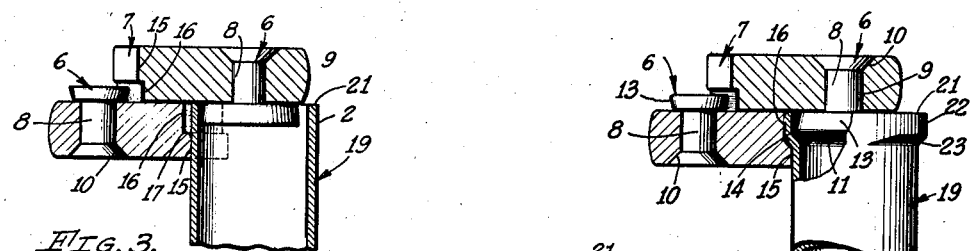
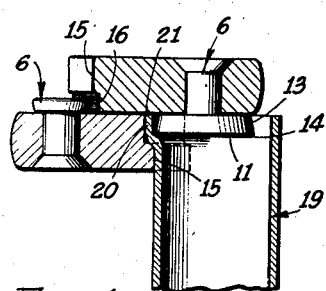
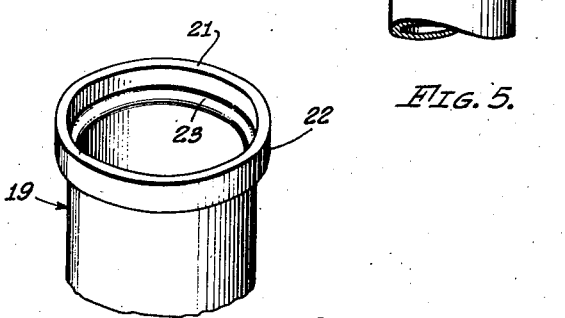
OTIS C. MARTIN,
INVENTOR;
BY *Harold W. Mattingly*
ATTORNEY Patented May 30, 1944

2,350,057

UNITED STATES PATENT OFFICE 2,350,057

FORMING TOOL

Otis C. Martin, Los Angeles, Calif.

Application May 26, 1941, Serial No. 395,200

7 Claims. (Cl. 81—15)

My invention relates to a forming tool and has particular reference to a tool for forming cylindrical enlargements on the ends of tubing and like thin walled pipes or conduits.

Many hydraulic or pneumatic power systems employ relatively thin walled tubing or conduits for interconnecting the various elements of the system, such thin walled tubes having such thin walls that it is not possible to cut or form threads upon the ends of such pipes or tubes for the purpose of connecting the tubes to each other and to valves, fittings and the like.

Heretofore it has been the common practice to make such connections by the use of "solderless" fittings wherein the end of the pipe or tube is flared outwardly to provide a tapered surface which is forced into metal to metal sealing contact with a conical seat formed upon the fitting or tubing connector, the metal to metal sealing engagement being maintained by clamping the flared end of the pipe against the conical seat.

These fittings have numerous disadvantages and I have, in my copending application Serial No. 341,856, filed June 22, 1940, and entitled "Tube coupling," disclosed and claimed a new form of tubing fitting which overcomes these disadvantages. Briefly the fitting disclosed in the aforementioned copending application employs sealing rings of rubber or similar material which are axially compressed and thereby expanded radially into sealing relation between the walls of the tubing and the wall of the bore in the fitting into which the end of the tubing is inserted. Axial sliding movement of the tube outwardly through the sealing rings is prevented by forming a cylindrical enlargement on the innermost end of the tubing.

The present invention provides a tool for forming such a cylindrical enlargement and is directed particularly to a hand tool which may be readily carried by a workman and which may be used to readily and rapidly form an enlargement of the desired character whenever and wherever such enlargement is needed.

It is, therefore, an object of my invention to provide a forming tool which may be engaged with the end of a tube and operated to form a cylindrical enlargement of said tube on said end.

It is also an object of my invention to provide a forming tool of the character set forth in the preceding paragraph which includes a pair of coacting die members engageable with the wall of a tubing for radially expanding a portion of the tube near the end to enlarge the diameter of the cylindrical end of such tube.

It is an additional object of my invention to provide a forming tool of the character set forth in the preceding paragraphs in which one die member is insertable into the open end of the tube and the other die member is engageable with the exterior of the tube.

It is a still further object of my invention to provide a forming tool of the character set forth hereinbefore in which the die members are engageable with a portion only of the circumference of the tube, whereby the cylindrical enlargement is formed by a plurality of forming operations performed progressively around the circumference of the tube.

It is also an object of my invention to provide a forming tool of the character set forth hereinbefore in which the die members are carried by a pair of pivotally interconnected handles, whereby movement of the handles produces the tube forming movement of the die members.

It is a still further object of my invention to provide a forming tool of the character set forth in the preceding paragraphs which includes a plurality of pairs of coacting die members permitting cylindrical enlargements to be formed on tubes of different sizes.

Other objects and advantages of my invention will be apparent from a study of the following specifications, read in connection with the accompanying drawing, wherein:

Fig. 1 is a perspective view illustrating the general form and construction of the preferred embodiment of my invention;

Fig. 2 is a cross sectional view taken substantially along the line II—II of Fig. 1 to illustrate the details of construction of the die members and the configuration of their forming surfaces;

Fig. 3 is a fragmentary sectional view similar to Fig. 2 but illustrating the manner in which the tube forming die members are positioned with respect to the end of a tube prior to the initiation of a forming operation;

Fig. 4 is a sectional view similar to Fig. 3 but illustrating the cooperative relation between the die members and the tube at the completion of the first forming operation;

Fig. 5 is a sectional view similar to Fig. 4 but illustrating the manner in which the forming operation is carried progressively around the circumference of the tube; and Fig. 6 is a perspective view illustrating the appearance and character of the cylindrical enlargement which is formed upon the end of thin walled tubings through the use of the forming tool of my invention.

Referring to the drawing, I have illustrated in Fig. 1 the preferred embodiment of my invention as comprising a hand tool I which may be constructed similar in form and appearance to a conventional pair of "gas" pliers. Accordingly the tool I comprises a pair of handle members 2 and 3 pivotally interconnected at their inner ends by means of a substantial pivot construction 4. The handles 2 and 3 are preferably curved and formed to conveniently fit the hand of a workman and may be knurled or otherwise provided with grip portions 5 to facilitate holding the tool in the hand.

The tool illustrated in Fig. 1 is provided with two pairs of coacting die members, each pair including a male die member 6 and a female die member 7, the male die member being secured to the handle portions 2 and 3 and the coacting female die portion 7 being preferably formed integrally with the handle portions 3 or 2.

As is best shown in Fig. 2, the male die member 6 may comprise a rivet-like member having a shank portion 8 received within a suitable bore 9 formed in the handle portion 2 or 3 upon which the die member 6 is secured. The outer end of the bore 9 is preferably countersunk as indicated at 10 to permit the outer end of the shank portion 8 to be riveted over and secure the die member 6 to the handle and at the same time provide a surface which is flush with the surface of the handle member.

The inner end of the die member 6 is headed as is illustrated in Fig. 2, the head comprising a circular member of frustro-conical form, the larger base of the frustum comprising the outer surface 11 of the die member 6 and the smaller base of the frustum comprising a shoulder 12 which bears against the inner surface of the handle member to which the die member is secured. The walls or sides 13 of the head portion are tapered inwardly toward the handle member and the corner formed by the junction of the sides 13 with the outer base 11 is preferably rounded as indicated at 14 in Fig. 2. The die member 6 is preferably formed of a relatively hard material so as to resist wear and deformation resulting from continued use of the tool.

The female or outer die member 7 may be formed integrally with the handle portions 2 and 3 and preferably comprises a semi-circular recess or notch cut laterally into the handle members from the inner or adjacent edges thereof. The recess or notch is formed with a small diameter portion 15 and a large diameter portion 16 which together form a centrally disposed shoulder 17. The difference in radii between the two cylindrical surfaces 15 and 16 is adjusted to conform to the desired radial enlargement which is to be produced upon the end of a tubing through use of the tool. The corner formed by the junction of the shoulder 17 with the smaller radius surface 15 is preferably rounded as indicated at 18 in Fig. 2. The corners 13 and 18 are rounded to prevent actual cutting of the tubing when the tubing is engaged by these corners in the manner illustrated in Figs. 3, 4 and 5.

In using the tool, the handle members 2 and 3 are spread relative to each other and the end of a piece of tubing 19 is slipped over the male die member 6 in the manner illustrated in Fig. 3. Thereupon the handles 2 and 3 are squeezed together, resulting in a movement of the die member 6 toward the surface 16 of the female die member 7 and resulting in a lateral displacement or offsetting of an upper edge portion 20 of the tubing which is engaged by the inner die member 6. In so displacing the end portion of the tubing, the tubing is bent outwardly over the rounded corner 18 until the extreme upper edge 21 of the tubing engages the larger radius surface 16 of the female die member. Thereupon outward movement of the edge 21 is arrested and further movement of the die member 6 toward the surface 16 results in the bending of the upper edge portion 20 about the rounded corner 13 formed on the die member 6, with the ultimate result that there is produced a local offset in the wall of the tubing somewhat in the manner illustrated in Fig. 4.

Subsequent to the above described operation, pressure on the handles is released and the tubing is rotated about its own axis through a relatively small angle which may range from fifteen to forty-five degrees. Thereupon the handles are again squeezed together to produce a lateral or radial offset in the wall of the tubing at this new location. This operation is repeated, the tubing being rotated a part of a revolution between each squeezing of the handles, with the result that there is built up upon the end of the tubing a cylindrical enlargement of the character illustrated in Fig. 6. Fig. 4 illustrates the manner in which this enlargement is built up a portion at a time, Fig. 5 illustrating the character of the tube end when the enlargement has been extended about substantially three-fourths of the circumference of the tube.

I have found that where the diameter of the male die member 6 is nearly equal to the internal diameter of the tubing, a satisfactory cylindrical enlargement may be formed upon the end of the tubing in from six to eight individual forming operations. However, a more nearly perfect enlargement can be formed if the tubing is rotated through a somewhat smaller angle between each squeezing of the handles.

The enlargement formed by the tool above described is characterized by including an almost precisely cylindrical end portion 22 having a diameter materially greater than the diameter of the tubing. This enlarged portion is connected to the body of the tubing by an offset or transition section 23. The spacing between the outer base portion 11 of the male die member 6 and the shoulder 17 when the die members are moved to their closed position determines the amount of taper on the transition portion 23 or, conversely stated, controls the abruptness with which the tube is caused to expand to the larger diameter cylindrical portion 22.

The spacing between the above mentioned portions of the coacting die members is preferably made as close as possible without causing a tearing or cutting of the metal of which the tube is formed. This spacing will, to some extent, depend upon the character of the metal of which the tube is formed.

Reference to Fig. 2 will indicate that the die members 6 and 7 associated with the handle 3 have a larger diameter than do the die members associated with the handle 2. This permits the mechanic using the tool to select that pair of die members which most closely approaches the diameter of the tubing being worked upon and at the same time provides for the forming of cylindrical enlargements on the ends of a plurality of different sizes of tubes.

From the foregoing it will be observed that I have provided a forming tube which may be employed to readily and rapidly form cylindrical enlargements upon the ends of tubings and other thin walled conduits.

Attention is directed particularly to the fact that the form of the tool illustrated herein permits the tool to be readily carried on the person of a workman or mechanic so as to be continuously at hand and instantly available for use.

The form of the tool herein illustrated is particularly adaptable to the forming of cylindrical enlargements on tubes where space is restricted and where it would be impossible to employ forming tools of conventional construction.

While I have described the preferred form of my invention as being embodied in a relatively small hand tool, it will be realized that the relative sizes of the die members could be increased as desired to permit the forming of cylindrical enlargements upon the ends of larger diameter tubes and pipes and that, if desired, the die members could be incorporated in a bench type machine or one intended to be secured in a substantially fixed location.

While I have shown and described the preferred embodiment of my invention, I do not desire to be limited to any of the details of construction shown or described herein, except as defined in the appended claims.

I claim:

1. In a tool for forming a cylindrical enlargement on the end of a tube, the combination of: an outer die member having an abutment surface engageable with the exterior surface of said tube at a point spaced from the end thereof; an inner die member insertable into said tube and having a forming surface engageable with the interior surface of said tube at a point nearer the end of said tube than the point engaged by said abutment surface; and means mounting said inner die member for movement laterally of the length of said tube toward said outer die member to thereby displace the end portion of said tube outwardly, said outer die member also having an upper tubing engaging surface normally spaced from the exterior surface of said tube and extended parallel thereto for arresting outward movement of said end portion, whereby movement of said inner die member moves said displaced end portion to a position spaced outwardly from the exterior surface of said tube and disposed parallel thereto.

2. In a tool for forming a cylindrical enlargement on the end of a tube, the combination of: an outer die member having a pair of forming surfaces formed thereon comprising concentrically disposed segmental portions of concave cylindrical surfaces, one having a smaller radius of curvature at least as great as that of the exterior surface of said tube and the other having a radius of curvature larger than that of said smaller radius surface; an inner die member for insertion into the end of said tube having a convexly curved die surface disposed adjacent said larger radius forming surface and extending approximately parallel thereto; and means mounting said die members for movement laterally of the length of said tube toward and away from each other.

3. In a tool for forming a cylindrical enlargement on the end of a tube, the combination of: an outer die member having formed thereon a pair of concentrically disposed segmental cylindrical concave forming surfaces of different radius, the smaller radius one of said surfaces having a radius at least as great as that of the exterior surface of said tube; an inner die member insertable into said tube and having a portion of circular cross section sufficiently small to be received within the end of said tube; and means mounting said inner die member for movement laterally of the length of said tube toward and away from the larger radius one of said outer die member forming surfaces.

4. In a tool for forming a cylindrical enlargement on the end of a tube, the combination of: an outer die member having formed thereon a pair of concentrically disposed segmental cylindrical concave forming surfaces of different radius, the smaller radius one of said surfaces having a radius at least as great as that of the exterior surface of said tube; an inner die member of frustro-conical form disposed adjacent the larger radius one of said forming surfaces with the larger base of the frustum nearest the smaller radius one of said forming surfaces, said inner die member being insertable into the end of said tube; and means mounting said die members for movement laterally of the length of said tube toward and away from each other.

5. In a tool for forming a cylindrical enlargement on the end of a tube, the combination of: an outer die member having formed thereon a pair of concentrically disposed segmental cylindrical concave forming surfaces of different radius, the smaller radius one of said surfaces having a radius at least as great as that of the exterior surface of said tube, said surfaces being spaced axially of each other and the portion of the smaller radius surface adjacent the larger radius surface being curved outwardly; an inner die member insertable into said tube and having a portion of circular cross section sufficiently small to be received within the end of said tube; and means mounting said inner die member for movement laterally of the length of said tube toward and away from the larger radius one of said outer die member forming surfaces.

6. In a tool for forming a cylindrical enlargement on the end of a tube, the combination of: an outer die member having formed thereon a pair of concentrically disposed segmental cylindrical concave forming surfaces of different radius, the smaller radius one of said surfaces having a radius at least as great as that of the exterior surface of said tube, said surfaces being spaced axially of each other and the portion of the smaller radius surface adjacent the larger radius surface being curved outwardly; an inner die member of frustro-conical form insertable into the end of said tube and disposed adjacent the larger radius one of said forming surfaces with the larger base of the frustum nearest the smaller radius one of said forming surfaces, the corner comprising the intersection of said conical surface with said larger base being rounded; and means mounting said die members for movement laterally of the length of said tube toward and away from each other.

7. In a tool for forming a cylindrical enlargement on the end of a tube, the combination of: a pair of pivotally interconnected handles disposed in substantial side by side relation to each other, one of said handles having a notch formed in the inner side thereof defining a pair of concentrically disposed segmental cylindrical forming surfaces of different radius, the smaller radius one of said surfaces having a radius at least as great as that of the exterior surface of said tube; an inner die member secured to the other of said handles in a position to be moved into said notch by pivotal movement of said handles toward each other, said inner die member having a portion of circular cross section sufficiently small to be received within the end of said tube and positioned to be moved into engagement with the larger radius one of said forming surfaces upon said pivotal movement of said handles.

OTIS C. MARTIN.